United States Patent

Akamatsu et al.

[11] Patent Number: 5,908,490
[45] Date of Patent: Jun. 1, 1999

[54] ORGANIC SOLVENT RECOVERING SYSTEM AND ORGANIC SOLVENT RECOVERING METHOD

[75] Inventors: Mikio Akamatsu; Kenji Seki; Taketo Hata, all of Shizuoka, Japan

[73] Assignee: Toho Chemical Engineering and Construction Co., Ltd., Japan

[21] Appl. No.: 08/983,266

[22] PCT Filed: May 20, 1997

[86] PCT No.: PCT/JP97/01678

§ 371 Date: Jan. 12, 1998

§ 102(e) Date: Jan. 12, 1998

[87] PCT Pub. No.: WO97/44120

PCT Pub. Date: Nov. 27, 1997

[30] Foreign Application Priority Data

May 20, 1996 [JP] Japan ..................................... 8-148710

[51] Int. Cl.⁶ ............................ B01D 53/04; B01D 53/06
[52] U.S. Cl. ................................ 95/113; 95/142; 95/143; 95/147; 96/122; 96/125; 96/130; 96/145
[58] Field of Search ..................... 95/107, 113, 142–144, 95/147, 148; 96/122, 123, 125–128, 130, 132, 144, 145, 150

[56] References Cited

U.S. PATENT DOCUMENTS

| | | |
|---|---|---|
| 3,534,529 | 10/1970 | Mattia .................................. 96/122 X |
| 4,203,734 | 5/1980 | Winter et al. .......................... 95/142 X |
| 4,259,092 | 3/1981 | Matsuo et al. ............................. 95/113 |
| 4,409,006 | 10/1983 | Mattia ....................................... 95/113 |
| 4,536,197 | 8/1985 | Cook ......................................... 96/122 |
| 4,711,646 | 12/1987 | Acharya et al. ...................... 95/107 X |
| 4,846,852 | 7/1989 | Schweitzer et al. .................. 96/122 X |
| 5,125,935 | 6/1992 | Nakaya et al. ......................... 95/143 X |
| 5,149,342 | 9/1992 | Mestemaker et al. ................ 95/143 X |
| 5,240,475 | 8/1993 | Andersson et al. ................... 95/107 X |
| 5,584,916 | 12/1996 | Yamashita et al. ........................ 96/123 |
| 5,658,372 | 8/1997 | Gadkaree ............................... 95/144 X |
| 5,681,369 | 10/1997 | Osborne ................................ 95/143 X |
| 5,695,546 | 12/1997 | Izumi et al. .......................... 95/113 X |
| 5,702,505 | 12/1997 | Izumi et al. .......................... 95/113 X |

FOREIGN PATENT DOCUMENTS

| | | |
|---|---|---|
| 51-72968 | 6/1976 | Japan . |
| 52-29472 | 3/1977 | Japan . |
| 52-114568 | 9/1977 | Japan . |
| 61-68122 | 4/1986 | Japan . |
| 775714 | 3/1995 | Japan . |

*Primary Examiner*—Robert Spitzer
*Attorney, Agent, or Firm*—Lorusso & Loud

[57] ABSTRACT

A compact organic solvent recovery system includes a backup treatment apparatus for environmentally safe treatment of an organic solvent leaking into a gas exiting an adsorption tower packed with an adsorbing material such as particulate active charcoal or active carbon fiber. Adsorption treatment of organic solvents includes introducing an organic solvent containing gas to be treated into an organic solvent recovery apparatus including an adsorption tower packed with adsorbing material. By subsequently introducing steam into the adsorption tower, the organic solvents are desorbed. By introducing the treated gas discharged from the organic solvent recovery apparatus into the backup treatment apparatus, the organic solvents leaking into the treated gas are adsorbed, and the gas treated in the backup treatment apparatus is simultaneously discharged as purified gas. The backup treatment apparatus may be a rotary drum-type organic solvent treatment mechanism with a honeycomb structure having immobilized adsorbing material thereon. By then subjecting the backup treatment apparatus to a desorption treatment with a heated medium and recycling the desorbed and concentrated organic solvents to the adsorption tower of the organic solvent recovery apparatus, the treatments are repeated in a continuous manner while cooling and drying the adsorbing material.

15 Claims, 2 Drawing Sheets

ORGANIC SOLVENT RECOVERING SYSTEM AND ORGANIC SOLVENT RECOVERING METHOD

TECHNICAL FIELD

The present invention relates to an organic solvent recovery system for efficiently recovering an organic solvent from a gas containing the organic solvent, the system being capable of reducing the diffusion of the organic solvent to the environment to the extent possible, and an organic solvent recovery method using the same; and the present invention relates to a recovery system for recovery of organic solvents from a gas containing a mixture of organic solvents, and an organic solvent recovery method using the same.

BACKGROUND ART

Organic solvents have been used widely in various industries, and for the prevention of environmental pollution due to gas discharge from plants and factories, regulation of the content of organic solvents in gas discharge has been strengthened more severely in recent years. Thus, the establishment of a gas discharge disposal technique capable of further reducing the content of organic solvents has been desired.

The adsorbing materials conventionally used in organic solvent recovery apparatus to recover solvents from a gas containing organic solvents include particulate active charcoal and active carbon fiber primarily.

So as to recover organic solvents from a gas by organic solvent recovery apparatus using particulate active charcoal as the adsorbing material, the following processes are generally employed: an adsorption process comprising contacting a gas containing organic solvents with the adsorbing material to adsorb the organic solvents onto the material, a subsequent desorption process comprising desorbing the adsorbed organic solvents from the adsorbing material via heat while blowing steam into the adsorbing material, and a further subsequent drying process comprising introducing heated exterior air and the like into the adsorbing material in a state of high moisture and high temperature from the foregoing processing, for the purpose of elevating the adsorption capacity of the adsorbing material for recycle, and cooling and drying the adsorbing material by introducing unheated exterior air into the adsorbing material (Japanese Patent Laid-open No. Sho 51-72968).

Because micropores are present on the outer surface of active carbon fiber while micropores are present as active adsorbing sites inside particulate active charcoal, active carbon fiber has, characteristically, a faster adsorption rate and desorption rate of organic solvents than the respective rates of particulate active charcoal, along with a larger adsorption volume. Therefore, an organic solvent recovery apparatus using active carbon fiber as the adsorbing material requires only a short time for thermal exposure for desorbing organic solvents under steam purging, which is advantageous for efficient recovery of high-quality solvents (Japanese Patent Laid-open No. Sho 61-68122).

Because the cooling and drying of active carbon fiber with such properties in the organic solvent recovery process is generally promoted even by a gas containing organic solvents introduced in the adsorption process, the adsorption process comprising introducing a gas containing organic solvents may be initiated and concurrently carried out at an intermediate stage of the cooling and drying process using drying gas; or the introduction of a gas containing organic solvents at the adsorption stage may be direct without drying using drying gas, to promote the adsorption while advantageously retaining the cooling and drying effect. Therefore, the desorption and adsorption process comprising adsorption, desorption, cooling and drying (this stage sometimes overlaps with the adsorption stage) and adsorption, in this order, can be carried out advantageously within a short period of time.

On completion of desorption in the desorption and adsorption cycle using particulate active charcoal and active carbon fiber as the adsorbing materials, the individual adsorbing materials are in a wet state because of the steam used in the desorption stage. At the adsorption stage to be carried out subsequently, therefore, a gas containing organic solvents to be treated is introduced at a time when the cooling and drying stage is not sufficiently completed, so that the adsorption stage and the cooling and drying stage are simultaneously in progress. Hence, the adsorption potency of the adsorbing material is not yet sufficiently recovered, which relatively readily causes breakage, and creates a risk of organic solvents leaking into the treated gas.

Such risk is escalated significantly when a gas containing organic solvents which are non-adsorbable unless at higher concentrations is to be treated or when plural types of organic solvents with different levels of polarity are contained in a gas to be treated, such as a gas discharge containing a mixture of gaseous methylene chloride and methanol from plants producing photograph films, or when a low flow rate gas containing organic solvents at high concentrations is to be treated.

So as to prevent the leakage of organic solvents into the treated gas and to consistently maintain the concentration of organic solvents in the treated gas discharged from an adsorption tower after adsorption at an extremely low level (for example, 10 ppm or less), the adsorption volume of the organic solvent recovery apparatus should be high. In such case, however, the adsorbing material of the organic solvent recovery apparatus should be increased in volume, which requires modification of the apparatus on a relatively large scale, with the resultant disadvantages in the area of space occupied and in the cost. Particularly, when active carbon fiber with a higher adsorption efficiency is used as the adsorbing material, therefore, the scale of the apparatus is enlarged disadvantageously, because active carbon fiber has a lower bulk density than the density of particulate active charcoal.

Therefore, it is an object of the present invention to provide an organic solvent recovery system and an organic solvent recovery method, wherein a backup treatment apparatus is capable of environmentally safe treatment even if organic solvents leak into the gas treated in an adsorption tower packed with an adsorbing material, such as particulate active charcoal or active carbon fiber, and wherein the overall equipment can be made more compact.

In addition to the above object, a further object of the present invention is to provide an organic solvent recovery system and an organic solvent recovery method, wherein the system and the method are capable of environmentally safely treating a gas containing organic solvents which are non-adsorbable unless at higher concentrations or a mixture gas of plural types of organic solvents with different levels of polarity or a low flow rate gas containing organic solvents at high concentrations and wherein the overall equipment therefor can be made more compact.

DISCLOSURE OF INVENTION

So as to overcome the problems described above, the organic solvent recovery system of the present invention includes:

(1) an organic solvent recovery apparatus with an adsorption tower and an organic solvent separation apparatus for separating and recovering organic solvents desorbed in the adsorption tower, the adsorption tower adsorbing organic solvents from a gas containing organic solvents with an adsorbing material and desorbing the solvents with steam introduced therein, in a batch process; and (2) a backup treatment apparatus for capture of organic solvents leaking into the treated gas after adsorption treatment in the adsorption tower by continuous adsorption and desorption treatments of the previously treated gas, with the gas containing organic solvents after desorption treatment being recycled into the adsorption tower of the organic solvent recovery apparatus.

The organic solvent recovery method of the present invention comprises:

(1) introducing a gas containing organic solvents to be treated into an organic solvent recovery apparatus equipped with an adsorption tower packed with an adsorbing material, to adsorb the organic solvents;

(2) introducing steam into the organic solvent recovery apparatus, after completion of the adsorption treatment, for desorption of the adsorbed solvent;

(3) introducing the gas containing organic solvents desorbed in the desorption treatment into the solvent separation apparatus, to separate and recover the organic solvents;

(4) introducing the treated gas discharged from the adsorption tower after the adsorption treatment into a backup treatment apparatus for adsorption treatment of the organic solvents leaking into the treated gas and simultaneously discharging the gas treated in the backup treatment apparatus as a purified gas;

(5) carrying out a desorption treatment in the backup treatment apparatus with control of quantity of flow of heated gas introduced for desorption, so that the concentration of the organic solvents in the desorbed gas after the desorption treatment is higher than the concentration thereof in the gas introduced into the backup treatment apparatus;

(6) recycling the desorbed gas containing organic solvents after concentration in the backup treatment apparatus into the adsorption tower of the organic solvent recovery apparatus; and (7) repeating the aforementioned steps.

According to the organic solvent recovery method of the present invention, the introduction of a gas for drying and cooling the adsorbing material in the adsorption tower may satisfactorily be carried out, concurrently with the adsorption process, starting from the time of completion of the desorption process in the adsorption tower of the organic solvent recovery apparatus and continuing until after the first half of the adsorption stage.

The organic solvent recovery system and organic solvent recovery method of the present invention are preferably applied to the recovery of organic solvents from a gas mixture containing plural types of organic solvents.

By the organic solvent recovery system and organic solvent recovery method of the present invention, most of the organic solvents is adsorbed, desorbed and recovered in the organic solvent recovery apparatus. Even if the organic solvent leaks into the treated gas discharged after the adsorption treatment in the organic solvent recovery apparatus, the treated gas is continuously introduced into the backup treatment apparatus, where the organic solvents leaking into the treated gas can be adsorbed, concentrated and recycled into the organic solvent recovery apparatus where the solvents are repeatedly subjected to adsorption, desorption and recovery treatments. Hence, the recovery treatment can be carried out consistently in a stable manner, thereby reducing environmental pollution as much as possible, even if the content of the organic solvents in the treated gas varies or the types of the organic solvents in the treated gas change.

In accordance with the present invention, therefore, the adsorption treatment, desorption treatment and solvent recovery treatment of a gas containing organic solvents can be carried out in a safe manner, even if it is a solvent non-adsorbable unless at higher concentrations, such as a mixed gas of plural types of organic solvents with different levels of polarity, or a low flow rate of gas.

DESCRIPTION OF SYMBOLS

1: Blower; 2: Adsorption tower inlet line; 3: Adsorbing material; 4: Adsorption tower; 5, 6: Suction valve; 7, 8: Discharge valve; 9: Steam inlet line; 10: Recovery line; 11: Condenser; 12: Treated gas discharge line; 13: Treated gas inlet line; 14: Backup treatment apparatus; 15: Adsorbing material; 16: Heating apparatus; 17, 18: Steam valve; 19: Condenser

BEST MODE FOR CARRYING OUT THE INVENTION

Figure 1:
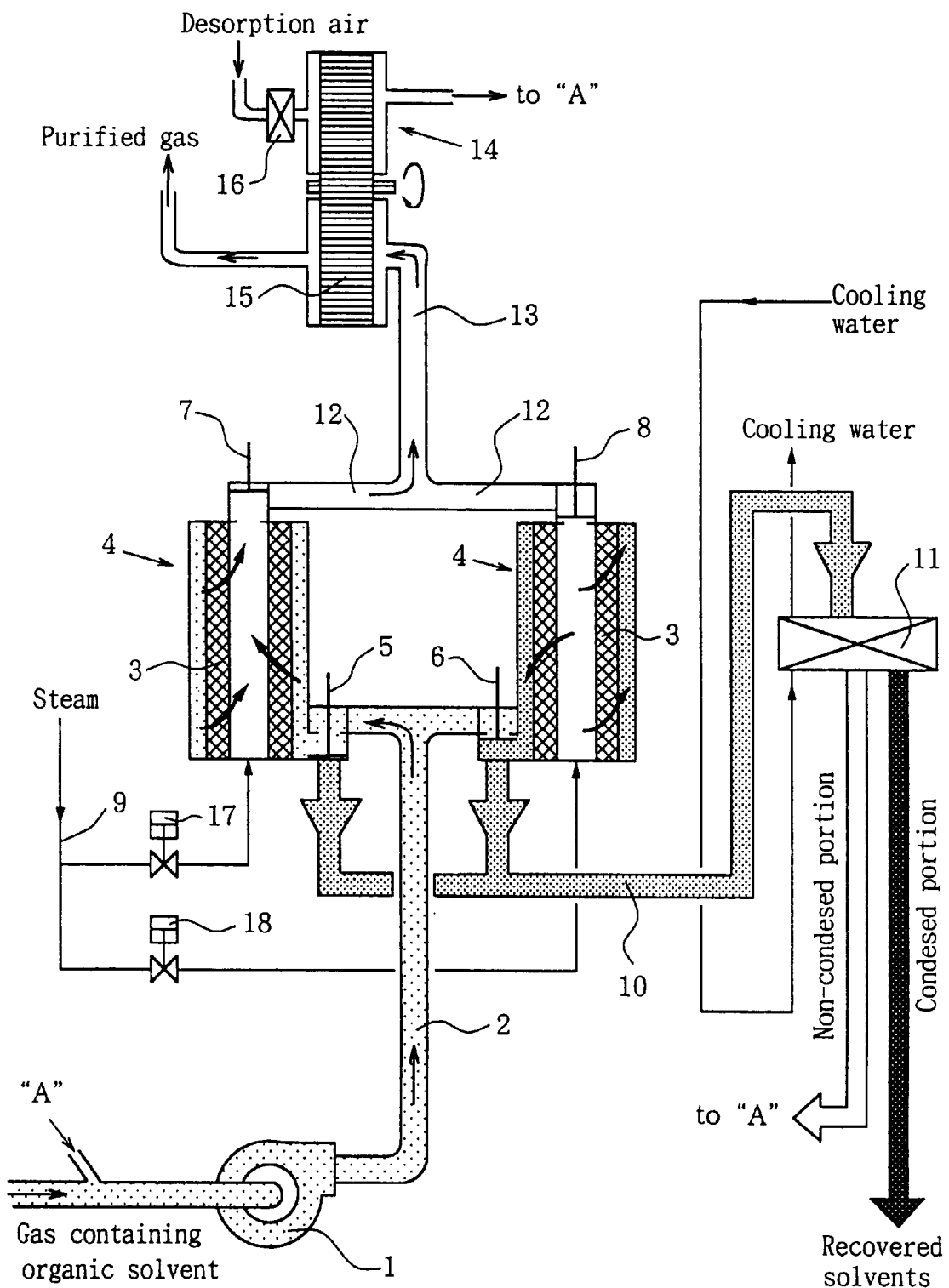
FIG. 1 is a flow chart of one preferred embodiment of the organic solvent recovery system of the present invention.

FIG. 1 is the flow chart of one preferred embodiment of the organic solvent recovery system of the present invention. The organic solvent recovery system of the present invention broadly comprises an organic solvent recovery apparatus capable of receiving a gas containing organic solvents, adsorption treatment, and desorption and recovery treatment of organic solvents, and a backup treatment apparatus capable of receiving the resulting gas discharged from the adsorption tower of the organic solvent recovery apparatus after adsorption treatment, to repeat the adsorption treatment and desorption treatment for organic solvents leaking into the treated gas and then transferring the gas into the organic solvent recovery apparatus.

In FIG. 1, a gas containing organic solvents, such as discharged from plants and factories, is transferred through adsorption tower inlet line 2 by blower 1 and is introduced into adsorption tower 4 packed with active carbon fiber or particulate active charcoal as adsorbing material 3. A plurality of units of adsorption tower 4, i.e. two or more adsorption towers, are arranged and structured to carry out continuously adsorption or desorption with no interruption, by alternately switching suction valves 5, 6 and discharge valves 7, 8 and alternately switching steam valves 17, 18.

The adsorption in the adsorption towers 4, 4 may be carried out immediately after the desorption process by steam heating, without cooling and drying using a specific cooling and drying gas. Alternatively, the adsorption process may be carried out at an appropriate time while introducing cooling and drying air. When the adsorbing material 3 is active carbon fiber, in particular, micropores are present on the outer surface of the fiber, so that cooling and drying are promoted merely through the introduction of the gas containing organic solvents, with gradual elevation of the adsorption potency. Hence, the cooling and drying using a specific cooling and drying gas can be skipped.

The organic solvents adsorbed in the adsorption tower 4 of the organic solvent recovery apparatus are desorbed by introducing steam through steam inlet line 9 into the adsorption tower 4. The desorbed organic solvents are introduced through recovery line 10 into condenser 11, where condensation with cooling water is carried out to yield the organic solvents recovered as a condensed portion. Alternatively, the non-condensed portion is mixed with the gas containing organic solvents used as the starting gas ("A" in FIG. 1).

In the adsorption process, the treated gas, discharged concurrently with the progress of the adsorption of organic solvents, passes through treated gas discharge line 12 and treated gas inlet line 13 into backup treatment apparatus 14 for further adsorption of organic solvents, whereby the organic solvents leaking into the treated gas are adsorbed. Simultaneously, the gas treated in the backup treatment apparatus 14 is discharged as purified gas.

Figure 2:
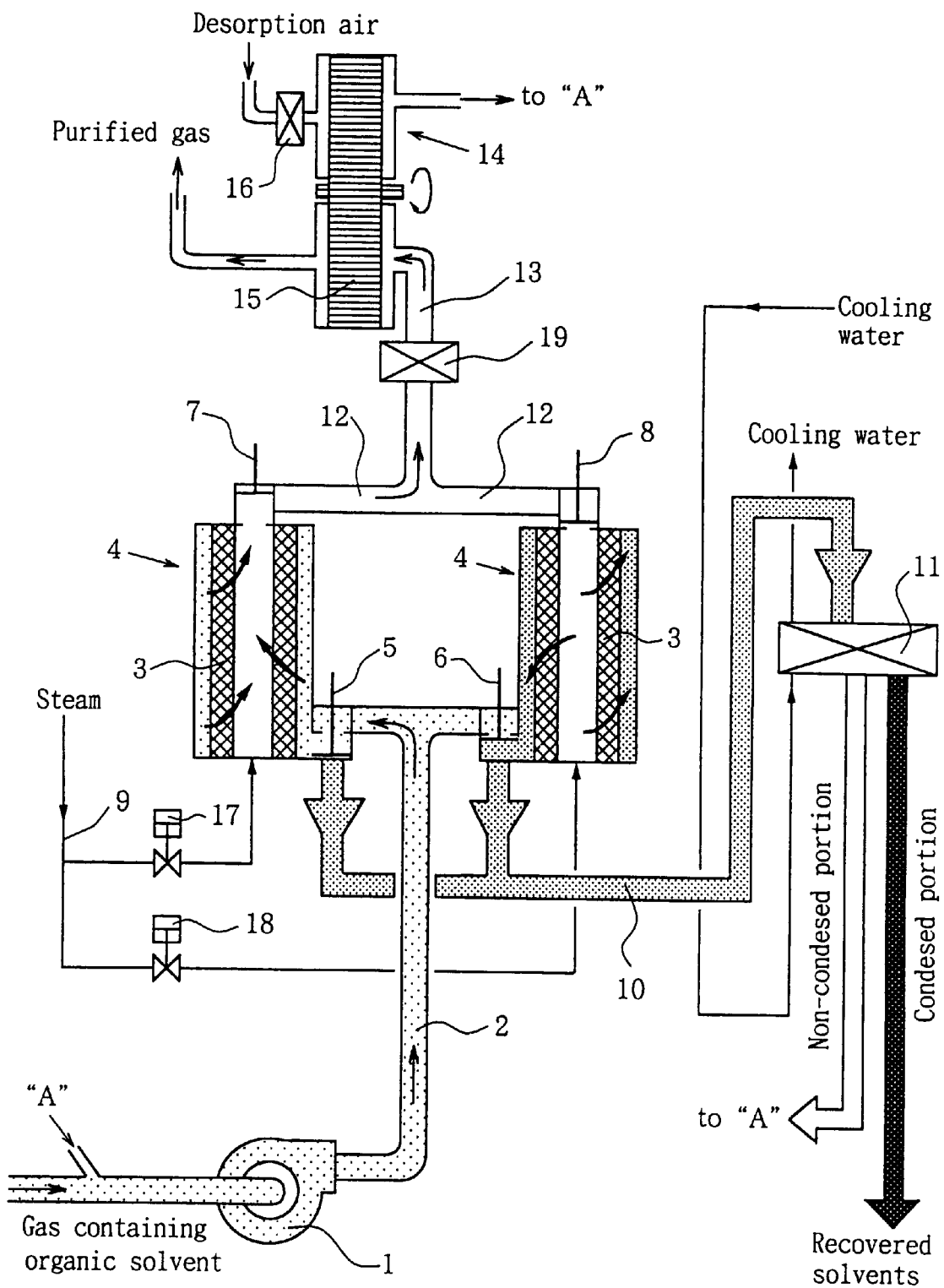
FIG. 2 depicts another preferred embodiment of the organic solvent recovery system of the present invention, which is equipped with a cooling mechanism for cooling and removing steam, being placed between the organic solvent recovery apparatus and the backup treatment apparatus of FIG. 1.

FIG. 2 depicts a second embodiment of the organic solvent recovery system of the present invention, wherein a cooling device 19 for cooling and removing steam is arranged between the organic solvent recovery apparatus 4, 4 and the backup treatment apparatus. 14. When the adsorbing material 3 of the organic solvent recovery apparatus is regenerated by steam, moisture may sometimes be adsorbed on the adsorbing material 3. When a gas containing organic solvents is fed onto such regenerated adsorbing material 3 in the subsequent adsorption process, steam may sometimes be contained in the treated gas at the initial stage. When the created gas contains steam, a cooling mechanism, for example condenser 19, capable of preliminarily cooling and removing steam contained in the treated gas from the organic solvent recovery apparatus, is preferably provided to preliminarily condense and remove steam contained in the treated gas discharged from the organic solvent recovery apparatus. This is because the adsorption efficiency of the backup treatment apparatus 14 is reduced if steam is contained in the treated gas.

The backup treatment apparatus 14 may be a rotatable drum-type organic solvent treatment mechanism having a great number of passages, in the form of a honeycomb from a sheet of an adsorbing material immobilized on thermally resistant paper. The drum-type organic solvent treatment mechanism has a plurality of radially divided zones and the adsorption process or desorption process in each zone is continuously switched by the rotation of the drum-type organic solvent treatment mechanism for continuous operation (such drum-type organic solvent treatment mechanism is known from the description in the International Publication No. 91/16971).

The backup treatment apparatus 14, i.e. the continuously rotating drum-type organic solvent treatment mechanism, is particularly suitable for highly efficient purification of a gas containing organic solvents at lower concentrations, and the apparatus 14 serves to adsorb a small amount of organic solvents leaking from the adsorption tower 4, for further purification. Additionally, the apparatus 14 works to continuously carry out the desorption treatment of the gas into a desorbing medium, such as air heated in the heating apparatus 16, thereby concentrating the organic solvents. Furthermore, the backup treatment apparatus 14 functions to recycle the desorption gas containing the resulting concentrated organic solvents to the adsorption tower 4 ("A" in FIG. 1). The backup treatment apparatus 14 with such various functions may be structured as a single unit, for use as an attachment to be mounted on the organic solvent recovery apparatus with adsorption tower 4 of a conventional type.

The adsorbing material 15 immobilized on the backup treatment apparatus 14 may be the same material as the adsorbing material 3 packed in the adsorption tower 4, but preferably, the material 15 is a material of a different type, capable of efficiently recovering the organic solvents not adsorbed in the adsorption tower 4. When the adsorbing material 3 to be used in the adsorption tower 4 is particulate active charcoal or active carbon fiber, for example, the adsorbing material 15 to be used in the backup treatment apparatus 14 is preferably one of a different type of adsorption activity, such as zeolite.

Among organic solvents, for example, lower concentrations of trichloroethylene, perchloroethylene and methylene chloride can be relatively readily adsorbed onto particulate active charcoal and active carbon fiber, but methanol, ethanol and isopropanol are adsorbed only at relatively high concentrations on particulate active charcoal and active carbon fiber. Characteristically, the present invention is particularly effective in the treatment of a gas containing a mixture of plural types of organic solvents with different properties.

By using the organic solvent recovery system shown in FIG. 1 as the base system and by using active carbon fiber as the adsorbing material 3 in the adsorption tower 4 of the organic solvent recovery apparatus and using zeolite as the adsorbing material 15 of the backup treatment apparatus 14, various gases containing various organic solvents were treated and purified under the following conditions, to recover the organic solvents.

EXAMPLE 1

Two adsorption towers 2, packed with active carbon fiber in the amount of 3 kg per one unit, were used to treat a methylene chloride containing gas (starting gas), at a gas temperature of 26° C., a gas moisture of 75 RH%, and a gas concentration of 7200 ppm and at a treating volume of 3.0 $Nm^3/sec$, to carry out the adsorption and desorption of methylene chloride with alternate switching providing adsorption for 8 minutes and desorption for 6 minutes. The methylene chloride recovered through desorption was condensed and recovered by a condenser.

After such treatment, the treated gas discharged from the adsorption tower contained methylene chloride in the amount of 10 to 105 ppm (35 ppm on average). The treated gas was continuously introduced into the backup treatment apparatus. As the backup treatment apparatus, use was made of a drum-type organic solvent treatment mechanism, with zeolite immobilized thereon, and having a 440-mm diameter, a 400-mm thickness, a 0.116-$m^2$ effective area and a 6 - rph rotational speed. In the desorption process, the volume of heated air flow was controlled to provide a final concentration ratio of 5-fold. The methylene chloride containing gas desorbed in the backup treatment apparatus was recycled to the adsorption tower. The methylene chloride concentration in the gas purified by the system of the present Example 1 (the gas after treatment in the backup treatment apparatus) was reduced down to 3.2 to 3.8 ppm (3.5 ppm on average).

The results of treatment in the present Example 1 are shown in Table 1 below.

TABLE 1

| | Gas concentration: ppm |
|---|---|
| Starting gas | 7,200 |
| After ACF adsorption treatment | 10 to 105 (35 on average) (a peak present immediately after switching) |
| After zeolite honeycomb treatment | 3.2 to 3.8 (3.5 on average) |

EXAMPLE 2

Two adsorption towers 2, each packed with active carbon fiber in the amount of 4.5 kg, were used to treat a gas containing an organic solvent mixture of methylene chloride and methanol (starting gas) (methylene chloride concentration of 32000 ppm; methanol concentration of 3000 ppm), at a gas temperature of 17° C., a gas moisture of 55 RH%, and a gas concentration of 35000 ppm and at a treating volume of 1.0 $Nm^3$/sec, to carry out adsorption and desorption of the organic solvent mixture with alternate switching providing adsorption for 8 minutes and desorption for 6 minutes. The methylene chloride and methanol recovered through desorption were individually condensed by a condenser.

After such treatment, the treated gas discharged from the adsorption tower contained methylene chloride at 40 to 95 ppm (55 ppm on average) and methanol at 65 to 120 ppm (85 ppm on average). The treated gas was continuously introduced into the backup treatment apparatus. As the backup treatment apparatus, use was made of a drum-type organic solvent treatment mechanism, with zeolite immobilized thereon and having a 440-mm diameter, a 400-mm thickness, a 0.116-$m^2$ effective area and a 8 rph rotational speed. In the desorption process, the volume of heated air flow was controlled to provide a final concentration ratio of 5-fold. The gas containing methylene chloride and methanol was desorbed in the backup treatment apparatus and was then recycled to the adsorption tower. The methylene chloride concentration in the gas purified by the system of the present Example 2 (the gas after treatment in the backup treatment apparatus) was reduced down to 5 to 11.5 ppm (8.3 ppm on average); the methanol concentration was reduced down to 5.5 to 9.8 ppm (7.5 ppm on average).

The results of treatment in the present Example 2 are shown in Table 2 below.

TABLE 2

| | Gas concentration: ppm | |
|---|---|---|
| | methylene chloride | methanol |
| Starting gas | 32,000 | 3,000 |
| After ACF adsorption treatment | 40 to 95 (55 on average) | 65 to 120 (85 on average) |
| After zeolite honeycomb treatment | 5 to 11.5 (8.3 on average) | 5.5 to 9.8 7.5 on average) |

EXAMPLE 3

Two adsorption towers 2, each packed with active carbon fiber in the amount of 3.0 kg, were used to treat a gas containing an organic solvent mixture of toluene (at a concentration of 1900 ppm) and ethyl acetate (at a concentration of 300 ppm) (starting gas) at a gas temperature of 21° C., a gas moisture of 50 RH%, and a gas concentration of 2200 ppm and at a treating volume of 5.0 $Nm^3$/sec, to carry out adsorption and desorption of the organic solvent mixture with alternate switching to provide adsorption for 8 minutes and desorption for 6 minutes. The toluene and ethyl acetate recovered by desorption were individually condensed and recovered by a condenser.

After such treatment, the treated gas discharged from the adsorption tower contained toluene at 5 to 10 ppm (8 ppm on average) and ethyl acetate at 15 to 45 ppm (25 ppm on average).

The treated gas was continuously introduced into the backup treatment apparatus. As the backup treatment apparatus, use was made of a drum-type organic solvent treatment tank, with zeolite immobilized thereon and having a 440-mm diameter, a 400-mm thickness, a 0.116-$m^2$ effective area and a 6-rph rotational speed. In the desorption process, the volume of heated air flow was controlled to provide a final concentration ratio of 7-fold. After desorption in the backup treatment apparatus, the gas containing methylene chloride and methanol was recycled to the adsorption tower. The toluene concentration in the gas purified by the system of the present Example 3, i.e., in the gas after treatment in the backup treatment apparatus, was reduced down to 0.5 to 1.5 ppm (1.0 ppm on average); the ethyl acetate concentration was reduced down to 1.5 to 2.0 ppm (1.7 ppm on average).

The results of treatment in the present Example 3 are shown in Table 3 below.

TABLE 3

| | Gas concentration: ppm | |
|---|---|---|
| | toluene | ethyl acetate |
| Starting gas | 1,900 | 300 |
| After ACF adsorption treatment | 5 to 10 (8 on average) | 15 to 45 (25 on average) |
| After zeolite honeycomb treatment | 0.5 to 1.5 (1.0 on average) | 1.5 to 2.0 (1.7 on average) |

INDUSTRIAL APPLICABILITY

By the organic solvent recovery system and organic solvent recovery method in accordance with the present invention, a small amount of leaking organic solvents which cannot be sufficiently recovered in the recovery apparatus is concentrated in the backup treatment apparatus and is then recycled to the recovery apparatus, whereby these solvents are recovered at their concentrations suitable for their adsorption. Therefore, organic solvents, which are non-adsorbable unless at higher concentrations, can be recovered even if the solvents are contained in a gas to be treated or a plurality of organic solvents of different types can be recovered, and concurrently, the concentration of organic solvents in the resulting purified gas can be reduced.

Because the passages to recover and transfer the organic solvents are derived from the adsorption tower alone, a solvent separation apparatus such as a condenser can be integrated.

Even if the content of organic solvents which leak into the treated gas is a trace amount, the content can further be reduced for purification, in accordance with the present invention. Additionally, a low content of organic solvents leaking into the treated gas, which has been recovered conventionally with much difficulty, can be concentrated and recovered.

What is claimed is:

1. An organic solvent recovery method comprising:
   (1) introducing a gas containing organic solvents to be treated into an organic solvent recovery apparatus including at least a first adsorption tower packed with a first adsorbing material, for an adsorption treatment to adsorb the organic solvents and to provide a once treated gas stream of reduced organic solvent content;
   (2) introducing steam into the first adsorption tower recovery apparatus, after discontinuation of the adsorption treatment in the first adsorption tower, to desorb the organic solvent from the first adsorbing material, thereby regenerating the absorbing material, and to form a first solvent laden gas stream;
   (3) introducing the first solvent laden gas stream into a solvent separation apparatus, to separate and recover the organic solvents;
   (4) introducing the once treated gas stream from the organic solvent recovery apparatus into a backup treatment apparatus, adsorbing additional organic solvent on a second adsorbing material and simultaneously discharging gas treated in the backup treatment apparatus as a purified gas;
   (5) desorbing the additional organic solvent from the second adsorbing material in the backup treatment apparatus by introducing a controlled flow of a heated gas into the backup treatment apparatus to produce a second solvent laden gas stream having a concentration of organic solvents which is higher than the concentration thereof in the once treated gas stream introduced into the backup treatment apparatus;
   (6) recycling the second solvent laden gas stream into the organic solvent recovery apparatus; and
   (7) carrying out steps (1)–(6) in a repeated manner.

2. An organic solvent recovery method according to claim 1, further comprising introducing a gas, for drying and cooling the first adsorbing material, into the adsorption tower concurrently with the adsorption treatment, starting from discontinuation of the desorption treatment in the adsorption tower of the organic solvent recovery apparatus to the following first half stage of the adsorption process.

3. An organic solvent recovery method according to claim 1, wherein the backup treatment apparatus is a rotary drum organic solvent treatment mechanism including a rotatable honeycomb structure with an adsorbing material immobilized thereon and having a plurality of radially extending zones and switching the adsorbing and desorbinq in each zone by rotating the honeycomb structure for continuous operation.

4. An organic solvent recovery method according to claim 1, wherein the raw gas contains a plurality of different types of organic solvents.

5. An organic solvent recovery method comprising:
   (1) introducing a raw gas containing organic solvents to be treated into at least one of a plurality of adsorption towers in an organic solvent recovery apparatus, said adsorption towers being packed with an adsorbing material, adsorbing the organic solvents onto the adsorbing material and thereby forming a once treated gas stream;
   (2) introducing steam into the organic solvent recovery apparatus, after discontinuing step (1), thereby desorbing organic solvent from the adsorbing material and forming a first solvent laden gas stream;
   (3) introducing the first solvent laden gas stream into a solvent separation apparatus, to separate and recover the organic solvents;
   (4) alternately and sequentially switching the introducing of the raw gas and the introducing of the steam among the plurality of the adsorption towers thereby continuously carrying out the absorbing and the desorbing concurrently, in different adsorption towers;
   (5) introducing the once treated gas into a backup treatment apparatus for adsorbing additional organic solvents onto an adsorbing material and producing a purified gas;
   (6) desorbing organic solvent from the adsorbing material in the backup treatment apparatus by introducing a controlled flow of heated gas thereto to form a second solvent laden gas stream having a concentration of organic solvents higher than the concentration of organic solvents in the once treated gas introduced into the backup treatment apparatus;
   (7) recycling the second solvent laden gas stream to an adsorption tower of the organic solvent recovery apparatus; and
   (8) carrying out steps (1)–(7) in a repeated manner.

6. An organic solvent recovery system, for separating and recovering an organic solvent from a raw gas stream, said system comprising:
   (1) organic solvent recovery means for successive batchwise adsorption of the organic solvent by adsorption onto an adsorbent and desorption of the organic solvent from the adsorbent, said organic solvent recovery means including:
      at least a first adsorption tower containing an absorbent for the organic solvent;
      means for introducing the raw gas stream into said adsorption tower for removal of the organic solvent by adsorption onto the adsorbent and for venting a once treated gas of reduced organic solvent content from said adsorption tower; and
      means for introducing steam into said adsorption tower to strip organic solvent from said adsorbent to form a first solvent laden gas stream and to regenerate the adsorbent;
   (2) backup treatment means for continuous treatment of the once treated gas of reduced organic solvent content to adsorb additional organic solvent;
   (3) means for desorbing organic solvent adsorbed in the backup treatment means to form a second solvent laden gas stream; and
   (4) means for recycling the second solvent laden gas stream to said adsorption tower.

7. An organic solvent recovery system according to claim 6 comprising a second adsorption tower containing said adsorbent;
   steam switching means for switching the introduced steam between said first adsorption tower and said second adsorption tower; and
   raw gas stream switching means for switching the raw gas stream between said first and second adsorption towers in coordination with said steam switching means so that one of the first and second adsorption towers receives the steam while the other of the first and second adsorption towers receives the raw gas stream.

8. An organic solvent recovery system according to claim 6, further comprising a cooling mechanism for cooling the once treated gas and condensing steam contained in the once treated gas, said cooling mechanism being located between the organic solvent recovery means and the backup treatment means.

9. An organic solvent recovery system according to claim 6, wherein the backup treatment means is a rotary drum organic solvent treatment mechanism including a rotatable honeycomb structure with an adsorbing material immobilized thereon and having a plurality of radially extending zones, whereby the adsorption and the desorption are continuously switched for each of said zones with continuous rotation of the drum organic solvent treatment mechanism.

10. An organic solvent recovery system according to claim 9, wherein an adsorbing material, different from the adsorbent contained in the first adsorption tower, is immobilized on the honeycomb structure.

11. An organic solvent recovery system according to claim 10, wherein the adsorbing material immobilized on the honeycomb structure is selected from the group consisting of zeolites, active carbon fiber and particulate active charcoal.

12. An organic solvent recovery system according to claim 6, wherein the adsorbent contained in the first adsorption tower is selected from the group consisting of active carbon fiber and particulate active charcoal.

13. An organic solvent recovery system according to claim 12 wherein said backup treatment means contains zeolite as an adsorbent.

14. An organic solvent recovery system according to claim 6, wherein the backup treatment apparatus is a rotary drum organic solvent treatment mechanism including a rotatable honeycomb structure with zeolite as an adsorbing material immobilized thereon and having a plurality of radially extending zones, whereby the adsorption and the desorption are continuously switched for each of the zones with continuous rotation of the drum organic solvent treatment mechanism.

15. An organic solvent recovery system according to claim 14 wherein the backup treatment apparatus is integrated into a single unit as an attachment to said organic solvent recovery means.

* * * * *